United States Patent
Bogan et al.

(10) Patent No.: US 8,315,457 B2
(45) Date of Patent: Nov. 20, 2012

(54) SYSTEM AND METHOD FOR PERFORMING MULTI-IMAGE TRAINING FOR PATTERN RECOGNITION AND REGISTRATION

(75) Inventors: Nathaniel Bogan, Natick, MA (US); Xiaoguang Wang, Alpharetta, GA (US); Aaron S. Wallack, Natick, MA (US)

(73) Assignee: Cognex Corporation, Natick, MA (US)

( * ) Notice: Subject to any disclaimer, the term of this patent is extended or adjusted under 35 U.S.C. 154(b) by 898 days.

(21) Appl. No.: 12/291,670

(22) Filed: Nov. 12, 2008

(65) Prior Publication Data

US 2009/0290788 A1 Nov. 26, 2009

Related U.S. Application Data

(60) Provisional application No. 61/008,900, filed on Dec. 21, 2007.

(51) Int. Cl.
G06K 9/62 (2006.01)
(52) U.S. Cl. .......................... 382/155; 382/159; 382/224
(58) Field of Classification Search .................. 382/155, 382/159, 103, 118, 190, 224, 225, 179, 228, 382/154, 203; 600/408, 411; 707/780, E17.039
See application file for complete search history.

(56) References Cited

U.S. PATENT DOCUMENTS

| | | | |
|---|---|---|---|
| 5,761,326 A | 6/1998 | Brady et al. | |
| 6,639,624 B1 | 10/2003 | Bachelder et al. | |
| 6,751,338 B1 | 6/2004 | Wallack | |
| 6,771,808 B1 | 8/2004 | Wallack | |
| 6,853,751 B1 * | 2/2005 | Milligan et al. | 382/199 |
| 6,901,236 B2 | 5/2005 | Saitoh et al. | |
| 7,006,669 B1 | 2/2006 | Lavagnino et al. | |
| 7,068,817 B2 | 6/2006 | Bourg, Jr. et al. | |
| 7,119,351 B2 | 10/2006 | Woelki | |
| 7,260,813 B2 | 8/2007 | Du et al. | |
| 7,280,697 B2 * | 10/2007 | Perona et al. | 382/225 |
| 7,660,440 B2 * | 2/2010 | Bourg et al. | 382/110 |
| 7,697,752 B2 * | 4/2010 | Li et al. | 382/159 |

OTHER PUBLICATIONS

Kraut, et al., "Comparison of Functional MR and $H_2^{15}O$ Positron Emission Tomography in Stimulation of the Primary Visual Cortex", AJNR Am J Neuroradiol 16:2101-2107, Nov. 1995, American Society of Neuroradiology, pp. 2101-2107.

U.S. Appl. No. 61/008,900, filed Dec. 21, 2007, for "System and Method for Performing Multi-Image Training for Pattern Recognition and Registration", by Nathaniel Bogan, et al., 25 pages.

(Continued)

*Primary Examiner* — Anh Hong Do (57) ABSTRACT

A system and method for performing multi-image training for pattern recognition and registration is provided. A machine vision system first obtains N training images of the scene. Each of the N images is used as a baseline image and the N−1 images are registered to the baseline. Features that represent a set of corresponding image features are added to the model. The feature to be added to the model may comprise an average of the features from each of the images in which the feature appears. The process continues until every feature that meets a threshold requirement is accounted for. The model that results from the present invention represents those stable features that are found in at least the threshold number of the N training images. The model may then be used to train an alignment/inspection tool with the set of features.

12 Claims, 5 Drawing Sheets

OTHER PUBLICATIONS

Hicks, et al., "Automatic landmarking for building biological shape models", IEEE ICIP 2002, vol. 2, pp. 801-804, (2002).

Duta, et al., "Automatic construction of 2D shape models", IEEE Transactions on Pattern Analysis and Machine Intelligence, vol. 23, No. 5, (May 2001).

Zhao, et al., "A non-linear corresponder for 2D automated point distribution model construction", 2004 $8^{th}$ International Conference on Control, Automation, Robotics and Vision Conference, China, (2004).

Hill, et al., "Automatic landmark generation for point distribution models", In Proc. British Machine Vision Conference (BMVC), pp. 429-438, (1994).

Sebastian, et al., "Constructing 2D curve atlases", IEEE Workshop on Mathematical Methods in Biomedical Image Analysis, (2000).

PCT Search Report for PCT/US2008/013823, Jun. 19, 2009.

* cited by examiner

SYSTEM AND METHOD FOR PERFORMING MULTI-IMAGE TRAINING FOR PATTERN RECOGNITION AND REGISTRATION

RELATED APPLICATIONS

The present invention claims the benefit of U.S. Provisional Application No. 61/008,900, filed on Dec. 21, 2007, for SYSTEM AND METHOD FOR PERFORMING MULTI-IMAGE TRAINING FOR PATTERN RECOGNITION AND REGISTRATION, by Nathaniel Bogan, et al., the content of which is incorporated herein by reference.

BACKGROUND OF THE INVENTION

1. Field of the Invention

The present invention relates to machine vision systems and, more specifically, to performing multi-image training for pattern recognition and registration for machine vision systems.

2. Background Information

The use of advanced machine vision systems and their underlying software is increasingly employed in a variety of manufacturing and quality control processes. Machine vision enables quicker, more accurate and repeatable results to be obtained in the production of both mass-produced and custom products. Basic machine vision systems include one or more cameras (typically having solid-state charge couple device (CCD) imaging elements) directed at an area of interest, frame grabber/image processing elements that capture and transmit CCD images, a computer and display for running the machine vision software application and manipulating the captured images, and appropriate illumination on the area of interest.

Many applications of machine vision involve the inspection of components and surfaces for defects that affect quality. Where sufficiently serious defects are noted, a part of a surface is marked as unacceptable/defective. Machine vision has also been employed in varying degrees to assist in manipulating manufacturing engines in the performance of specific tasks.

The advent of increasingly faster and higher-performance computers, has enabled the development of machine vision systems that employ powerful search tools. In general, advanced machine vision tools acquire an image of a pattern via a camera and analyze the outline or a particular part of the pattern, such as a predetermined fiducial mark. The processing speed of the underlying computer in which the tool resides is sufficient to enable a very large number of real time calculations to be completed in a short time frame. This particularly enables the search tool to determine the coordinates within an image reference system for each analyzed point in the viewed area, and correlate these through repetition with a desired pattern. The search tool may map the locations of various points in the captured image to stored points in the model image, and determine whether the captured image points fall within an acceptable range of values relative to the model image points. Using various decision algorithms, the tool decides whether the viewed pattern, in a particular rotation and scale corresponds to the desired search pattern. If so, the tool confirms that the viewed pattern is, in fact, the pattern for which the tool is searching and fixes its position and orientation.

An example of such a search tool is the PatMax® product available from Cognex Corporation of Natick, Mass. One noted disadvantage of certain machine vision tools is that they perform training operations from a single training image. As industrial processes often exhibit a high degree of variability, choosing a single training image will bias the pattern and/or model towards the variations that appear in the single training image. Variations may include, for example, changes in lighting conditions and/or direction of light sources, small changes in perspective ("plane wobble"), background noise, rotation and/or translation of features within the image, etc. As noted, by utilizing a single training image, any of these variables that are included in the training image may cause a bias in the pattern utilized by the machine vision tool for identifying features during run time. For example, should the single training image include a poor representation of one feature, the trained model would incorporate a bias towards images that include similar poor representations of that feature. This may result in false negatives, i.e., decisions by the machine vision system that a feature is not present when, in fact, it is present in an image.

One approach to avoid the noted disadvantages of using single image training is to utilize a plurality of training images and to perform image averaging to generate an averaged training image. In such systems, a plurality of images is taken and an average of each pixel is calculated to generate the averaged training image. A noted disadvantage of such averaging techniques is that edges within the averaged training image may be blurred by the averaging operation. Additionally, erroneous features within the image that only appear in certain images may not be fully removed. For example, if an image contains a very bright erroneous feature in a first training image and not in a second training image, the average training image will contain a medium brightness feature. However, this feature is still erroneous as compared to the desired training image. Additionally, performing the averaging of the training images necessitates extremely precise alignment of the individual images in the average.

More generally, prior art techniques for registering a pattern often provide incorrect registration of consistent features, i.e., features that appear consistently in all images taken of a particular view. This may be due to variations in location of the feature, changes in lighting conditions, etc. What is needed is a technique to enable the training of a machine vision system to detect consistent features under high degrees of variability.

SUMMARY OF THE INVENTION

The present invention overcomes one or more of the disadvantages of the prior art by providing a system and method for performing multi-image training for pattern recognition and registration. In accordance with an illustrative embodiment of the present invention, a machine vision system first obtains N training images of the scene. Illustratively, each of the N images contains variations from each other. One of the N images is then selected and the other N−1 images are then substantially registered to the selected image. This registration functions as a "coarse" alignment of each of the images with the selected baseline image, which may require that the other images are translated and/or rotated so that the images are appropriately registered. This selection and registration is iterated so that each of the N images is utilized as the baseline image.

By iterating for each of the N images as a baseline image, the procedure builds up a database of corresponded features that may be utilized in building a model of features that are stable among the images. Then features that represent a set of corresponding image features are added to the model. To build the database of corresponded features, each of the features may be corresponded using a boundary inspection tool or other conventional techniques to correspond contours in machine vision systems. Illustratively, those features selected for the model are those that minimize the maximum distance among the corresponding features in each of the images in which the feature appears. The feature to be added to the model may comprise an average of the features from each of the images in which the feature appears.

The process continues until every feature that meets a threshold requirement is accounted for. Illustratively, a user may provide a threshold value for training purposes. By utilizing the threshold the user may determine what level of consistency is required among images for a feature to be incorporated into the training model for the machine vision system. The model that results from this process represents those stable features that are found in at least the threshold number of the N training images. This process identifies those features that are sufficiently supported by the evidence of the training images that they are stable features. The model may then be used to train an alignment/inspection tool with the set of features.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Machine Vision System

Figure 1:
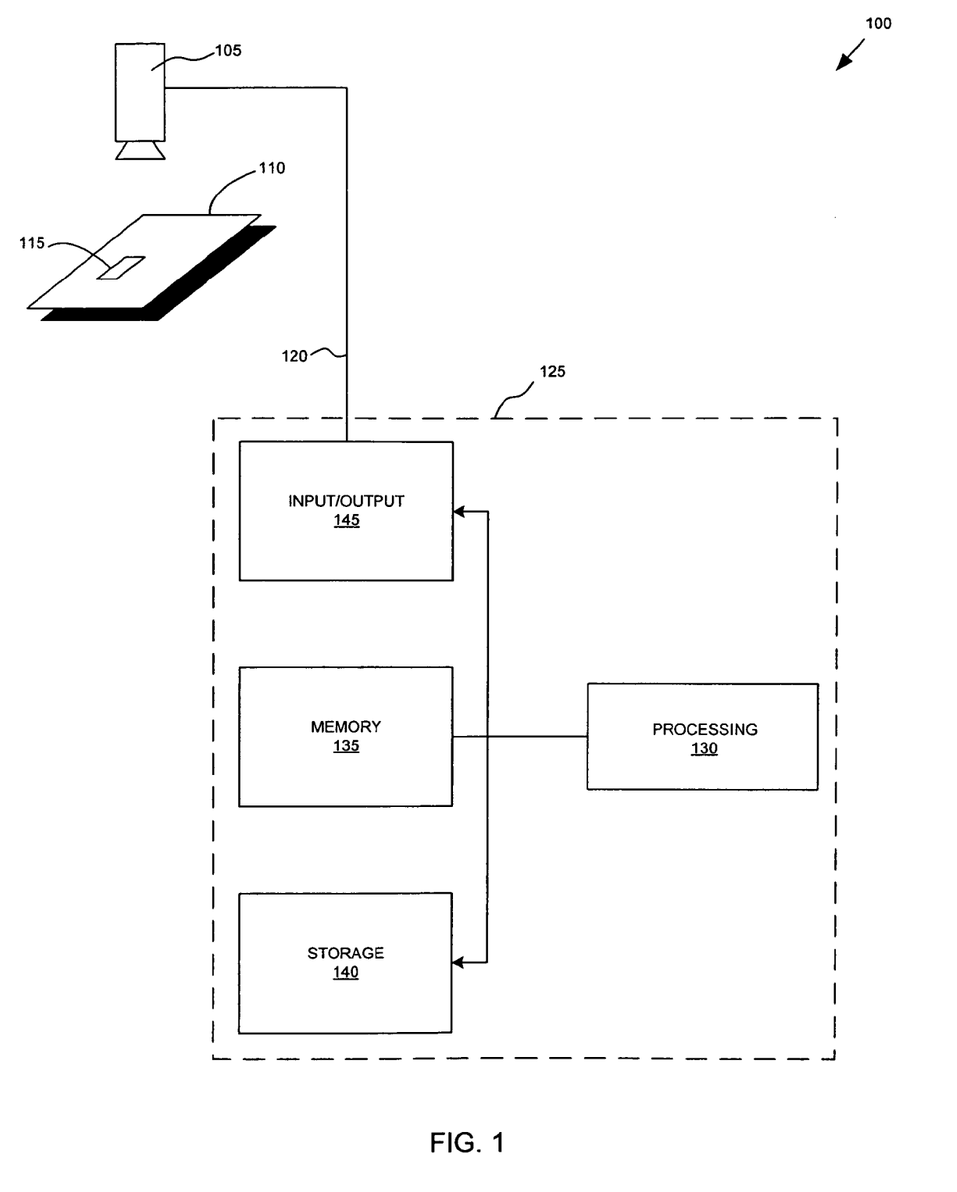
FIG. 1 is a schematic block diagram of an exemplary machine vision system for practicing the principles of the present invention in accordance with an illustrative embodiment of the present invention.

FIG. 1 is a schematic block diagram of a machine vision system 100 that may be utilized to practice the principles of the present invention in accordance with an illustrative embodiment of the present invention. The machine vision system 100 includes a capturing device 105 that generates an image of an object 110 having one or more features 115. The capturing device 105 may comprise a conventional video camera or scanner. Such a video camera may be a charge coupled device (CCD) or other system for obtaining appropriate image information, such as the well-known CMOS sensors. Image data (or pixels) generated by the capturing device 105 represents an image intensity, for example, color or brightness of each point in the scene within the resolution of the capturing device 105. The capturing device 105 transmits a digital image data via a communications path 120 to an image analysis system 125. The image analysis system 125 may comprise a conventional digital data processor, such as the vision processing systems of the type commercially available from, for example, Cognex Corporation. The image analysis system 125 may comprise a conventional microcomputer or other exemplary computing device. Other forms of interfaces may be utilized, including, e.g., personal digital assistants (PDAs), etc. In alternative embodiments, the capturing device may include processing capabilities to perform the functions of the image analysis system. In such embodiments, there is not a need for a separate image analysis system. In further alternative embodiments, a capturing device may be operatively interconnected with an image analysis system for training purposes. Once training has occurred, an appropriate model or models may be stored in the capturing device for use during run time.

The image analysis system 125 may be programmed in accordance with the teachings of the present invention to find similar features among a plurality of images to generate appropriate recognition and registration information for training a machine vision system. The image analysis system 125 may have one or more central processing units (processors) 130, main memory 135, input/output systems 145 and one or more disk drives or other form of mass storage 140. Illustratively, the input/output system 145 interconnects with the communications path 120 between the capturing device 105 and the image analysis system 125. The system 125 may be configured by programming instructions in accordance with the teachings of the present invention to perform the novel multi-image trained pattern recognition and registration of the present invention. As will be appreciated by those skilled in the art, alternative hardware and/or software configurations may be utilized to implement the principles of the present invention. Specifically, the teachings of the present invention may be implemented in software, hardware, firmware and/or any combination thereof. Furthermore, during run-time, as opposed to training time, additional components may be included in the machine vision system 100. For example, objects 115 may be transported by a conveyor belt or other assembly line apparatus, etc.

In accordance with an illustrative embodiment of the present invention, the machine vision system 100 may be utilized to generate the training model for a run-time machine vision system. Thus, the machine vision system 100 may be utilized to generate a training model that may be utilized in a plurality of machine vision systems utilizing similar components.

It should be noted that while the present invention is described in terms of a machine vision system 100, the principles of the present invention may be utilized in a variety of differing embodiments. As such, the term machine vision system should be taken to include alternative systems. More generally, the principles of the present invention may be implemented on any system that registers subpatterns in images. For example, one embodiment may involve a conventional machine vision system comprising of a stand alone camera operatively interconnected with a stand alone computer programmed to process images, etc. However, the principles of the present invention may be utilized in other devices and/or systems that register subpatterns in images. For example, a vision sensor, such as the Checker product available from Cognex Corporation, or other device that comprises illumination sources, image acquisition capabilities and/or processing capabilities. Such vision sensors may be trained and/or configured via separate modules, such as a Cognex VisionView. In such embodiments, the user may train the vision sensor using a plurality of parts, instead of a single part. The user may select a first part, place it in front of the sensor and indicate to the system that the training part is positioned. A second (third, etc.) part may be similarly trained. The user may control the training step using, e.g., a graphical user interface (GUI) and/or buttons or other control surfaces located on either the training module and/or the vision sensor itself. Furthermore, the functionality of the present invention may be incorporated into handheld devices, wireless compatible devices, etc. As such, the term machine vision system should be interpreted broadly to encompass all such systems and devices that may utilize one or more of the teachings of the present invention.

B. Multi-Image Registration

The present invention provides a system and method for performing multi-image training for pattern recognition and registration. In accordance with an illustrative embodiment of the present invention, a machine vision system first obtains N training images of the scene. Illustratively, each of the N images contains variations from each other. One of the N images is then selected and the other N−1 images are then registered to the selected image. This registration functions as a "coarse" alignment of each of the images with the selected baseline image, which may require that the other images are translated and/or rotated so that the images are appropriately registered. A noted advantage of the present invention is that the registration does not require the same precision as required by prior art averaging techniques. This selection and registration is iterated so that each of the N images is utilized as the baseline image.

By iterating for each of the N images as a baseline image, the procedure builds up a database of corresponded features that may be utilized in building a model of features that are stable among the images. Then features that represent a set of corresponding image features are added to the model. To build the database of corresponded features, each of the features may be corresponded using a boundary inspection tool or other conventional techniques to correspond contours in machine vision systems. Illustratively, those features selected for the model are those that minimize the maximum distance among the corresponding features in each of the images in which the feature appears. The feature to be added to the model may comprise an average of the features from each of the images in which the feature appears.

The process continues until every feature that meets a threshold requirement is accounted for. By utilizing a user-defined threshold, the user may determine what level of consistency is required among images for a feature to be incorporated into the training model for the machine vision system. The model that results from the present invention represents those stable features that are found in at least the threshold number of the N training images. The model may then be used to train an alignment/inspection tool with the set of features.

Figure 2:
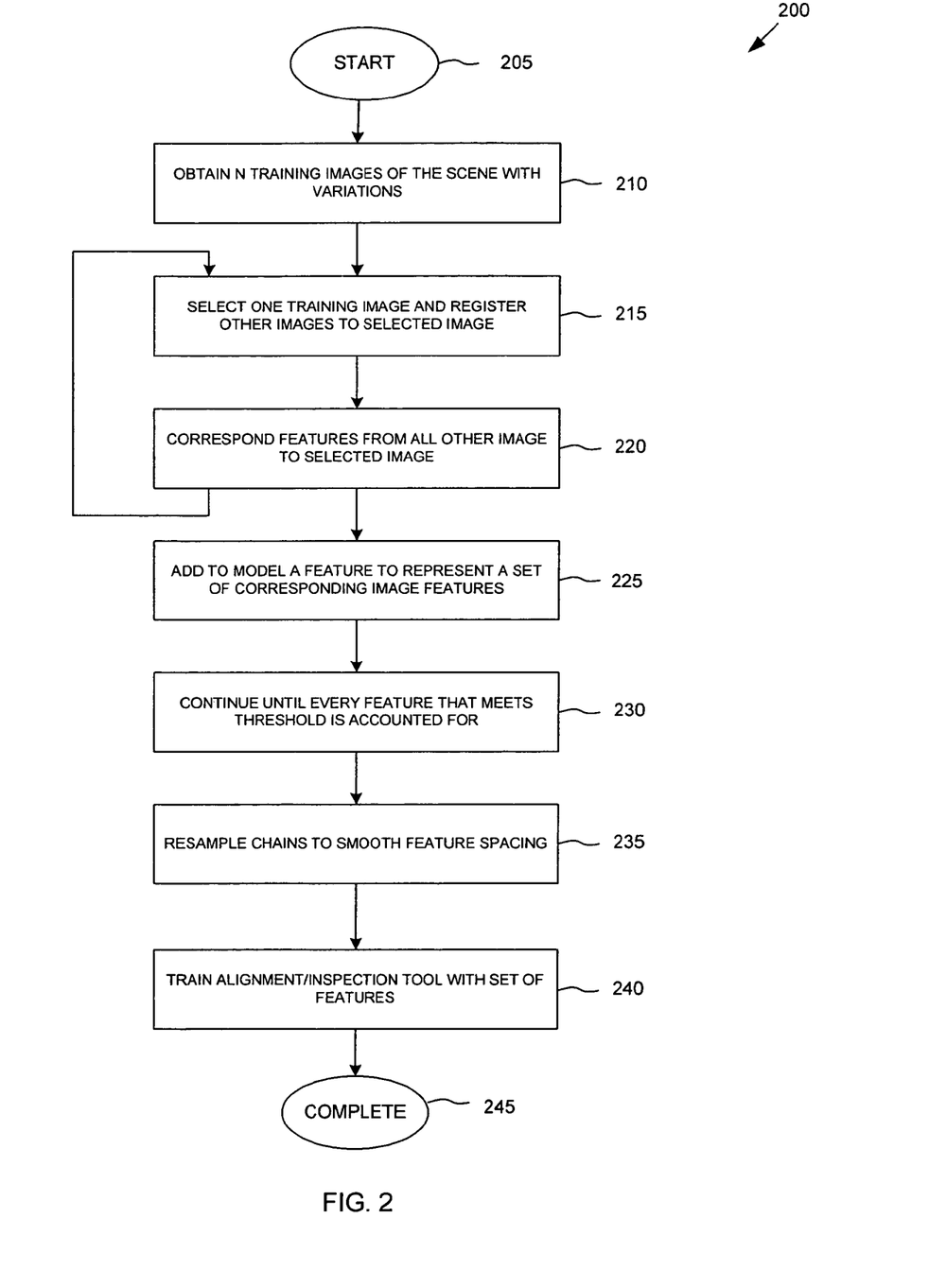
FIG. 2 is a flowchart detailing the steps of a procedure for performing multi-image training and pattern recognition and registration in accordance with an illustrative embodiment of the present invention.

FIG. 2 is a flow chart detailing the steps of an exemplary procedure 200 for performing multi-image training for pattern recognition and registration in accordance with an illustrative embodiment of the present invention. Illustratively, the procedure 200 may be performed by the machine vision system 100 described above in reference to FIG. 1. However, in alternative embodiments, the procedure 200 may be performed by other components, including specialized hardware, software, firmware and/or combinations thereof. Furthermore, in an illustrative embodiment, the image analysis system may comprise a conventional personal computer executing specialized machine vision software for implementing the principles of the present invention.

The procedure 200 begins in step 205 and continues to step 210 where N training images of a scene are acquired. In accordance with an illustrative embodiment of the present invention, each of the N training images contains variations from each other. That is, each of the N images is illustratively not of the identical component. Variations may include, for example, changes in illumination, location of identified features, manufacturing differences, plane wobble, etc. The present invention enables the identification of stable features among the N training images (or a threshold number of the training images). As such, by utilizing a number of sufficiently good enough training images, biases to a single image are avoided. Furthermore, the edge blurring common to averaging training images is prevented as there is no pixel averaging to generate the training image.

A user may selectively identify training images to enable the system to learn what features should be trained. Thus, for example, the user may generate X training images, wherein X>N, and select the N images from the set of X images. This enables the user to select those images where desired features are more prominently displayed, or which exhibit appropriate types of variations that the user is desirous of training the machine vision system to ignore. In an illustrative embodiment, the N images are taken with no user selection of which images to utilize.

Figure 3A:
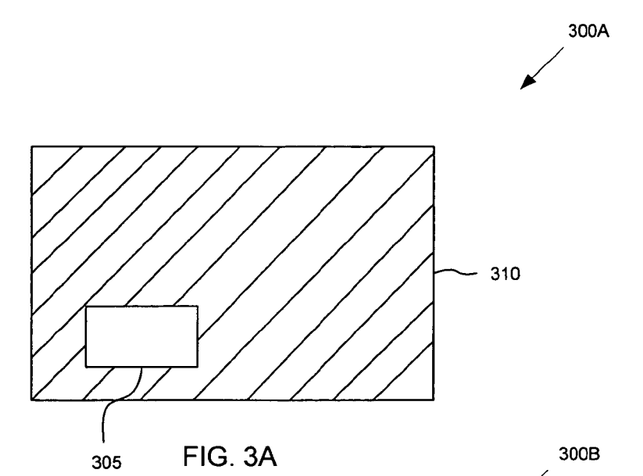
FIGS. 3A-C are exemplary training images in accordance with an illustrative embodiment of the present invention.
Figure 3B:
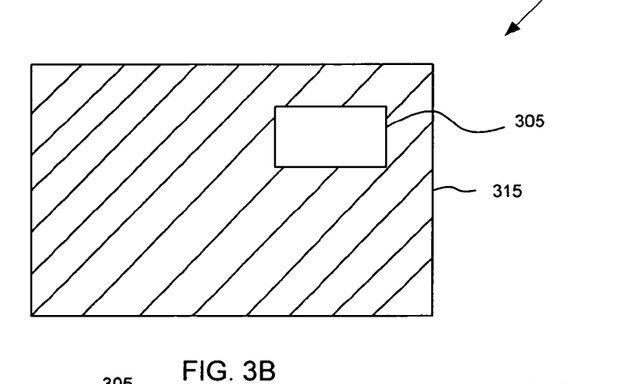
Figure 3C:
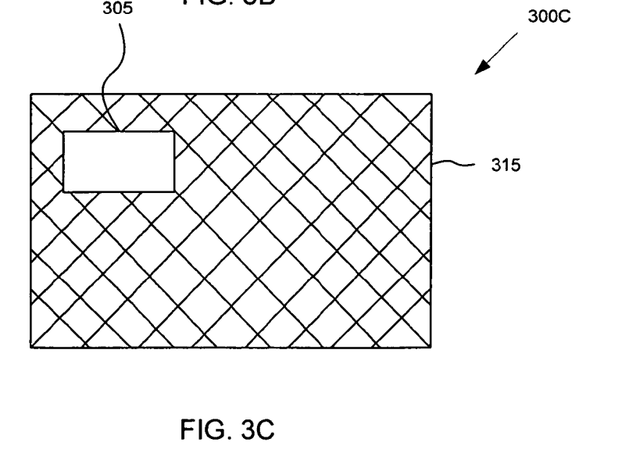

One example of variations that may be contained within a set of training images is shown in FIGS. 3A-C. FIG. 3A is an illustration of an object 310 containing a feature 305 in accordance with an illustrative embodiment of the present invention. As will be noted, the object 310 contains a diagonal hatching in the background. Similarly, FIG. 3B is an illustration of a second object 315 that includes the feature 305 in accordance with an illustrative embodiment of the present invention. In FIG. 3B, the feature 305 is located in a different location of the object 315 than the feature 305 located on object 310 in FIG. 3A. Similarly, the object 315 in FIG. 3B includes the diagonal hatching going in a differing direction from object 310. Finally, FIG. 3C is an illustration of a third object 320 having crosshatching differing from the previous two images. The feature 305 is located in yet another location within the object 320.

By utilizing images containing variations, a machine vision system trained in accordance with the principles of the present invention will learn what features to be trained on regardless of if the location of features are not consistent among the images or if the background of the features is different among the training images. Thus, for example, in the objects and features shown in FIGS. 3A-C, the diagonal lines and/or crosshatching along with the location of the feature are not consistent. The presence of the feature is consistent; however, it may be rotated and/or translated within the image of the object. Thus, the present invention will train on the object of interest, i.e., the feature 305, and will ignore the inconsistent variations among the training images.

Procedure 200 then continues to step 215 where one training image of the N training images is selected and the other images are registered to the selected training image. This registration functions as a coarse alignment of each of the images with the selected baseline image. For example, if the selected baseline image includes a + image contained within it, each of the other training images is aligned so that the + image contained therewithin is aligned with the selected baseline image. This may require that the other images are translated and/or rotated so that the images are appropriately registered. More generally, the registration step 215 aligns the images so that the features from all other images may then be corresponded to the selected baseline image in step 220.

Each of the features may be corresponded using a boundary inspection tool or other conventional techniques to correspond contours in machine vision systems. Any technique for corresponding contours may be utilized, including, e.g., the technique described in Alignment-Based Recognition of Shape Outlines, by Sebastian, Klein and Kimia, published in 2001, the contents of which are hereby incorporated by reference.

In accordance with an illustrative embodiment of the present invention, a contour matching technique is utilized that determines a least cost path through a graph of possible solution paths. Illustratively, the least cost path is computed by taking the sum of: (a) the sum of deformation costs from each feature in the correspondence to its corresponding model point(s), (b) the jump cost of each consecutive pair of points in the ordered list of points and (c) the penalty cost for any model sample points that appear on the path. Generally, the deformation cost is a measure of how much effort is required to make a point on one curve match a particular point on another curve. Illustratively, the local deformation cost may be defined as the weighted sum of the distance between the two points and the tangent angles associated with the two points.

The jump cost represents the cost of jumping from one corresponded feature to another as the defined curves are not necessarily continuous. Illustratively, as the contour matching technique utilizes discrete points along a curve, jumps up to a predefined length are part of a continuous curve and are associated with no jump cost. Thus, the jump cost between two features may be defined as the maximum of either 0 or the distance between to two features minus a predefined length.

The penalty cost represents a cost value when no image feature is considered to correspond to a particular model feature. In such cases, the contour matching technique illustratively follows along the model and utilizes the model samples. In an illustrative embodiment, this penalty cost is a predefined value.

By generating the correspondences, the technique obtains an ordered list of points representing either features of model samples. Illustratively, once the set of correspondences has been generated, the present invention then selects the most closely corresponded set. This is illustratively the path containing the lowest total cost.

The steps 215-220 are iterated by selecting each of the N images as the baseline image. By iterating for each of the N images as a baseline image, the procedure builds up a database of corresponded features that may be utilized in building a model of features that are stable among the images.

Figure 4A:
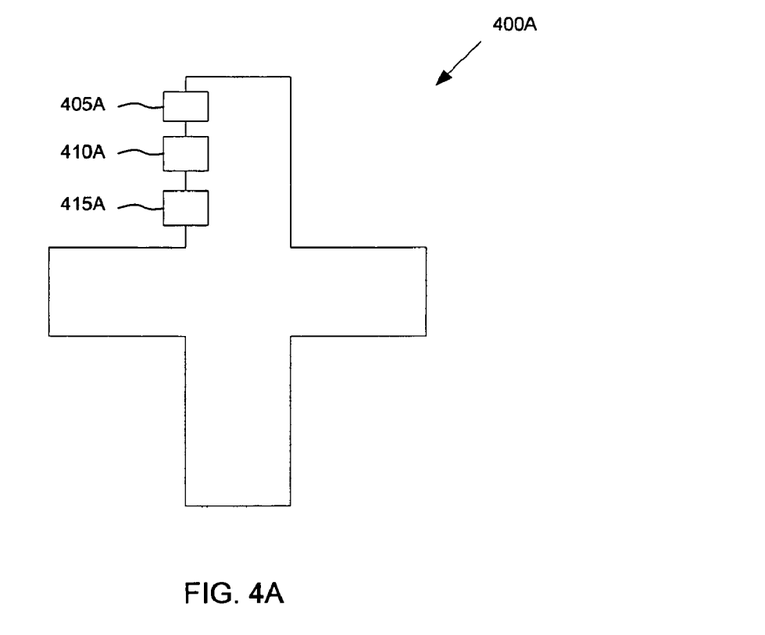
FIGS. 4A-B are images illustrating correlation between images in accordance with an illustrative embodiment of the present invention.
Figure 4B:
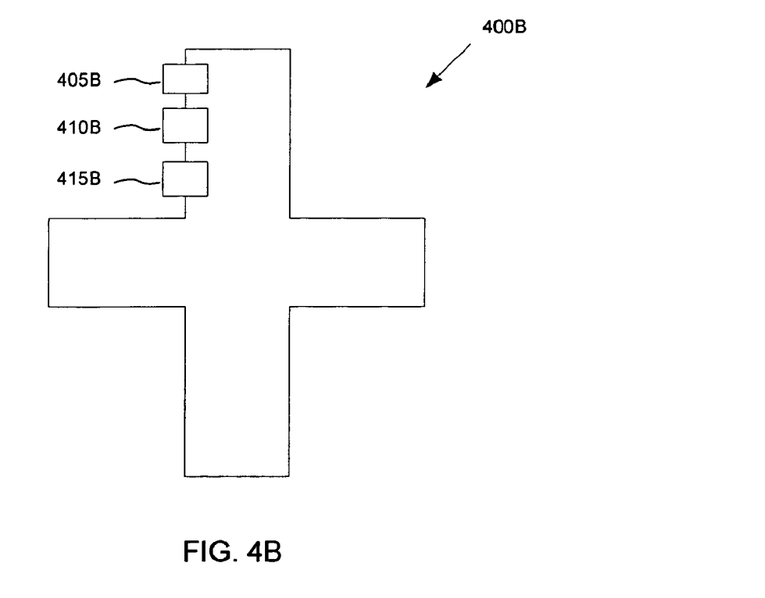

FIGS. 4A,B illustrate exemplary correspondences in accordance with an illustrative embodiment of the present invention. FIG. 4A shows an image 400A that includes three features, namely 405A, 410A, and 415A. Each of these features is located along the upper arm of the + image. While identifying correspondences in accordance with an illustrative embodiment of the present invention, features 405A, 410A and 415A may be corresponded to features 405B, 410B and 415B respectively from image 400B shown in FIG. 4B. Illustratively, those features selected for the model are those that minimize the maximum distance among the corresponding features in each of the images in which the feature appears. The feature to be added to the model may comprise an average of the features from each of the images in which the feature appears. Illustratively, the position and angle of each of the features will be averaged separately; however, in alternative embodiments they may be averaged together.

Once steps 215-220 have been iterated for each of the N images, the procedure 200 continues to step 225 where features that represent a set of corresponding image features are added to the model. The procedure identifies those set of features that correspond well among the images. Illustratively, those features selected for the model are those that minimize the maximum distance among the corresponding features in each of the images in which the feature appears. The feature to be added to the model may comprise an average of the features from each of the images in which the feature appears. In alternative embodiments, the median may be utilized, weighing by contrast, etc. As such, the description of averaging should be taken as exemplary only. The principles of the present invention may be utilized with any technique for determining a representative feature. When a set of features are added to the model, any duplicate contributing features are then removed from all remaining sets of features. This may cause some sets of features to fall below the threshold, see below, and therefore not be included in the final model. For example, given two sets of features {A,B,C,D,E} and {A,B,C,F,G}, if the first set of features ({A,B,C,D,E}) is added to the model, then features A,B and C are removed from the second set of features, thereby leaving that set as {F,G}. If the threshold is greater than 2, then this set of features cannot be incorporated into the final model.

The process continues until every feature that meets a threshold requirement is accounted for in step 230. Generally, each identified feature is iterated among all of the images to determine if it meets the appropriate threshold requirement. If it does not, then the feature is not included in the model. However, should the feature meet the threshold requirement, then it will be included within the training model.

Illustratively, a user may provide a threshold value for training purposes. Illustratively, the threshold value may be set at, for example, 75%. If the threshold value is set at 75%, then a particular feature needs to appear in at least 75% of the N images for it to be included in the final training model. By utilizing the threshold the user may determine what level of consistency is required among images for a feature to be incorporated into the training model for the machine vision system. Thus, the user may determine the amount of evidence required to support a feature for inclusion into the model.

By setting the threshold value at 100%, only those features that appear in each of the N images will be included in the model. More generally, by setting a threshold value of M, then a feature will appear in the final model if it appears in at least M of the N training images. Generally, the threshold value will be greater than 50%; however, this is not a requirement. In certain environments, the threshold value may be set to less than 50% and acceptable results obtained.

Figure 5A:
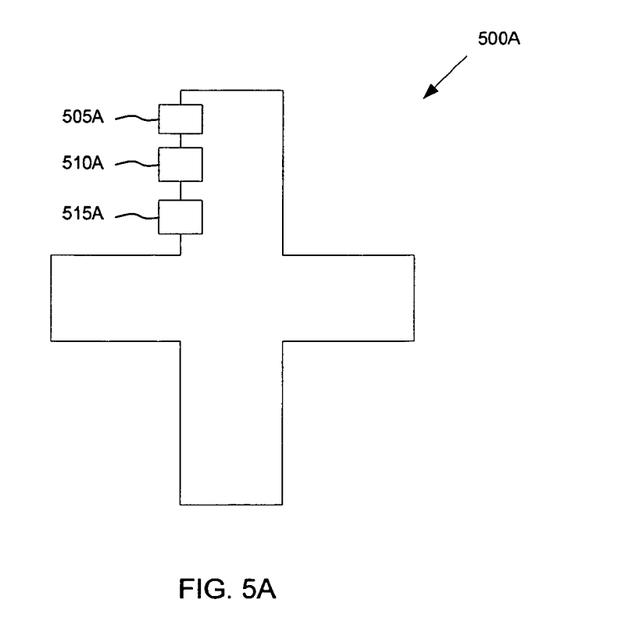
FIG. 5A-B are images illustrating optional smoothing of feature detection in accordance with an illustrative embodiment of the present invention.
Figure 5B:
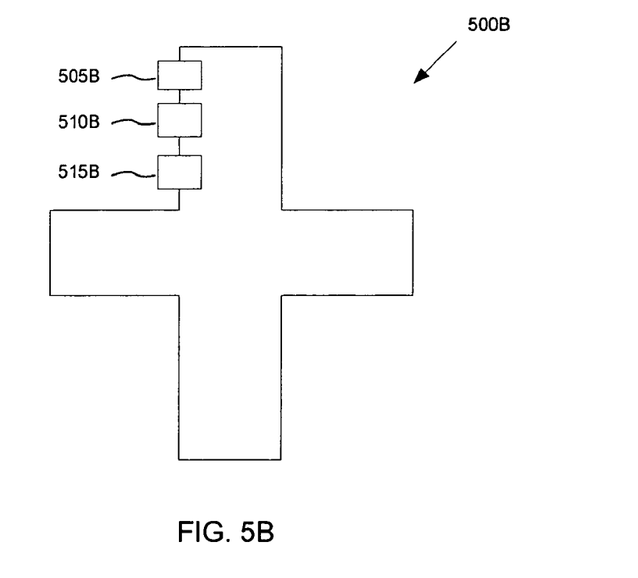

Optionally, the procedure, in step 235, may re-sample the features to smooth feature spacing. FIGS. 5A,B are exemplary images showing feature smoothing. The image 500A of FIG. 5A shows that the three features 505A, 510A and 515A are clumped very closely together along the top arm of the +. FIG. 5b shows a smoothed model 500B wherein the features 505B, 510B, 515B are more evenly spaced along the upper arm of the +.

The model that results from the present invention represents those stable features that are found in at least the threshold number of the N training images. The model may then be used to train an alignment/inspection tool with the set of features in step 240. The procedure 200 then completes in step 245.

To again summarize, the present invention enables the generation of a training model for a machine vision system that utilizes a plurality of training images. Each of the training images is registered to each other and the correspondences among the images are identified. Correspondences that meet a threshold requirement are added to the model. More generally, the present invention enables a model to be constructed wherein a first feature is obtained from a first training image, a second feature from a second training image, etc. By utilizing the present invention, features that are stable among the training images may be added to the model, whereas features that are not stable are not added to the training model. Stability is illustratively defined as a feature being located in at least M of the N training images.

The foregoing description has been directed to particular embodiments of this invention. It will be apparent, however, that other variations and modifications may be made to the described embodiments, with the attainment of some or all of their advantages. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for training a machine vision system, the method comprising the steps of:
    obtaining N training images;
    identifying one or more features that appear in at least M of the N training images;
    selecting one of the N training images as a baseline image, substantially registering the N−1 training images to the selected baseline image, and identifying corresponding features from the set of training images to the selected baseline image;
    identifying one or more features that are supported by evidence from at least one of the N training images; and
    generating, using a processor, a training model using the one or more identified features.

2. A method for training a machine vision system, the method comprising the steps of:
    identifying a first feature from a first training image of a first instance;
    identifying a second feature from a second training image of a second instance;
    selecting one of the first training image and the second training image as a baseline image, substantially registering one of the first training image and the second training image to the selected baseline image, and identifying corresponding features from the set of training images to the selected baseline image;
    identifying one or more features that are supported by evidence from at least one of the first training image and the second training image; and
    generating, using a processor, a model comprising of the first feature and the second feature to train the machine vision system.

3. The method of claim 2 wherein the first feature is stable between the first and second training images.

4. The method of claim 2 wherein the first feature appears in at least M of N training images.

5. A system for training a machine vision system, the system comprising:
    means for identifying a first feature from a first training image of a first instance;
    means for identifying a second feature from a second training image of a second instance;
    means for selecting one of the first training image and the second training image as a baseline image, substantially registering one of the first training image and the second training image to the selected baseline image, and identifying corresponding features from the set of training images to the selected baseline image;
    means for identifying one or more features that are supported by evidence from at least one of the first training image and the second training image; and
    means for generating a model comprising of the first feature and the second feature to train the machine vision system.

6. A method for identifying one or more stable features in a set of training images, the method comprising the steps of:
    (a) selecting one of the set of training images as a baseline image;
    (b) substantially registering the set of training images to the selected baseline image;
    (c) determining corresponding features from the set of training images to the selected baseline image;
    (d) repeating steps (a)-(c) with each image of the set of training images selected as the baseline image; and
    (e) identifying, using a processor, the one or more stable features from the set of training images that represent a set of corresponding features.

7. The method of claim 6 further comprising the step of re-sampling the set of identified features to smooth spacing among the set of identified features.

8. The method of claim 6 further comprising the step of training a machine vision tool with the set of features.

9. The method of claim 6 wherein the step of identifying the one or more stable features further comprises identifying a set of features that appear in at least a predetermined number of the training images.

10. A non-transitory computer readable medium, including program instructions executing on a processor, for identifying one or more stable features in a set of training images, the computer readable medium including program instructions for:
    (a) selecting one of the set of training images as a baseline image;
    (b) substantially registering the set of training images to the selected baseline image;
    (c) correspond features from the set of training images to the selected baseline image;
    (d) repeating (a)-(c) with each image of the set of training images selected as the baseline image; and
    (e) identifying, using a processor, the one or more stable features from the set of training images that represent a set of corresponding features.

11. A method for training a machine vision system, the method comprising the steps of:
    obtaining N training images;
    identifying a feature appearing in at least M of the N training images;
    iteratively selecting each of the N training images and registering the other training images to the selected training image;
    determining corresponding features from each of the other training images to the selected training image;
    generating, using a processor, a model of the feature by identifying that the feature corresponds to at least M of the N training images; and
    adding the identified feature to a model for use in training the machine vision system.

12. The method of claim 11 wherein the step of obtaining N training images further comprises the step of selecting, by a user, the N training images from a larger set of potential training images.

* * * * *